US006397467B1

(12) United States Patent
Werner et al.

(10) Patent No.: US 6,397,467 B1
(45) Date of Patent: Jun. 4, 2002

(54) INK JET PRINT HEAD AND METHOD OF PRODUCING THE INK PRINT HEAD

(75) Inventors: Wolfgang Werner; Thomas Zettler, both of München (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/528,417

(22) Filed: Mar. 17, 2000

Related U.S. Application Data

(62) Division of application No. 09/052,346, filed on Mar. 30, 1998, now Pat. No. 6,099,106, which is a continuation of application No. PCT/DE96/01858, filed on Sep. 27, 1996.

(30) Foreign Application Priority Data

Sep. 29, 1995 (DE) ........................................ 195 36 429

(51) Int. Cl.[7] ......................... B21D 53/76; G01D 15/00

(52) U.S. Cl. ......................... 29/890.1; 29/852; 29/846; 29/DIG. 16; 216/27; 216/32; 216/56; 430/320

(58) Field of Search ............................ 29/890.1, 25.35, 29/611, 830, 846, 852, DIG. 16; 347/63, 64, 65, 20; 216/27, 41, 39, 56; 430/320, 311, 313

(56) References Cited

U.S. PATENT DOCUMENTS 4,513,298 A 4/1985 Scheu ......................... 347/64
4,521,787 A 6/1985 Yokota ........................ 347/65
4,532,530 A 7/1985 Hawkins ...................... 347/62
4,596,994 A 6/1986 Matsuda ...................... 347/64
4,609,427 A * 9/1986 Inamoto et al. ............. 430/313
4,719,477 A 1/1988 Hess .......................... 438/220
5,185,055 A * 2/1993 Temple et al. ................ 216/27
5,690,841 A 11/1997 Elderstig ..................... 216/39

FOREIGN PATENT DOCUMENTS

DE 30 12 698 * 3/1981
EP 0 359 417 * 3/1990
EP 0 434 946 * 7/1991
EP 0 443 722 * 8/1991
JP 4-2790 * 1/1992

* cited by examiner

*Primary Examiner*—Peter Vo
*Assistant Examiner*—A. Dexter Tugbang
(74) *Attorney, Agent, or Firm*—Laurence A. Greenberg; Werner H. Stemer; Gregory L. Mayback

(57) ABSTRACT

The ink jet print head is formed with many parallel ducts, which are etched isotropically through openings in a first layer located above the ducts. After the etching operation, the openings of the first layer are closed by the deposition onto the first layer of a second layer, which covers the openings. The openings have a diameter of 1 $\mu$m, for instance. The openings, formed in the first layer by photolithography and ensuing dry etching, are disposed such that in an etching operation, the desired ducts underneath the first layer are laid bare. It is thus not necessary to adjust the relative positioning of two or more etched plates, closed ducts are formed without bonding or adhesive techniques, and the trigger circuit and the print head can be integrated on a single substrate.

15 Claims, 3 Drawing Sheets

INK JET PRINT HEAD AND METHOD OF PRODUCING THE INK PRINT HEAD

CROSS-REFERENCE TO RELATED APPLICATION

This is a division of U.S. application Ser. No. 09/052,346, filed Mar. 30, 1998 and now U.S. Pat. No. 6,099,106, which was a continuation of copending international application PCT/DE96/01858, filed Sept. 27, 1996, which designated the United States.

BACKGROUND OF THE INVENTION

1. Field of the Invention

The invention relates to an ink jet print head with mutually parallel ducts formed inside a substrate and separated by partition walls. The ducts are provided with a cover plate and one outlet opening on each of their ends. One thermal or piezoelectric element is associated with each duct. Upon excitation and with ink fluid disposed inside the duct, the element effects an expulsion of a drop of ink from the outlet opening. The invention further relates to a method of producing such an ink jet print head.

2. Description of the Related Art

Ink jet print heads are widely used in ink jet printers. The ink jet print head usually operates by the known drop on demand or DOD method, described for instance in German Patent DE 30 12 698 C2. There, to create a dot on a medium to be imprinted, such as paper, a drop of ink is expelled from a duct of the ink jet print head as soon as a thermal or piezoelectric element associated with the duct is triggered with a suitable current pulse from a driver circuit. The excitation occurs as the result of a current pulse 2 $\mu$s to 10 $\mu$s in duration, for instance, thus releasing thermal energy of approximately 15 to 50 microjoules. This heating leads to local evaporation of the ink fluid (bubble formation). The column of fluid is positively displaced from the corresponding duct outlet opening but without initially tearing. Once the current pulse ends, the bubble collapses above the thermal element. As a consequence, some of the fluid column is drawn back in. A drop of ink separates from the column outside the duct outlet openings and moves onward due to the conservation of momentum. These drops of ink create a black printed dot, in the case of black ink, on the paper. The typical emission frequency is approximately 5 kHz.

To create a character, such as a letter, the thermal or piezoelectric elements of the parallel ducts must be suitably supplied with current pulses by the driver circuit in such a way that the dots required for these letters become visible on the paper as a result of the impact of corresponding drops of ink.

Because of the very small duct diameter and close matrix spacings between the ducts (or jets), processing methods known from semiconductor technology are employed to create ink jet print heads. Examples of such processing methods are described in European Patent Disclosures EP 0 359 417 A2 and EP 0 434 946 A2, and in IEEE Transactions on Electron Devices, Vol. 26, 1979, p. 1918. In contrast to the production of integrated semiconductor circuits, which are formed on a single substrate, the prior art methods for producing ink jet print heads require at least two different substrates. On one substrate, partitions between ducts are formed, and these are closed by a separately produced cover plate made of a second substrate.

In the prior art methods, heating resistors can be disposed on or in the duct for thermal excitation. Often the ducts are formed by orientation-dependent etching in a silicon substrate. The heating resistors can be secured to the ducts by bonding. A glass plate, for instance, may be used as the cover plate. The glass plate is mounted on the duct plate, and hence in the first substrate, by anodic bonding.

As disclosed by the European document EP 0 443 722 A2, the ducts of the ink jet print head can also be formed by adjusting a cover plate, provided with partitions, onto a first substrate that is provided with heating resistors. Instead of the cover plate provided with partitions, a flat cover plate can also be glued to the first substrate, if the aforementioned ducts have already been machined into the first substrate, in the form of duct bottoms and two duct side walls each. The glued-on cover plate then forms the top of the duct for these ducts.

A problem associated with these prior art methods for producing integratable ink jet print heads is the absolute necessity of two substrates that must be joined to one another. This requires complicated adjustment, and the fine conduits must be protected against contamination while the two substrates are being glued together, which means additional effort and expense.

SUMMARY OF THE INVENTION

It is accordingly an object of the invention to provide a TITLE, which overcomes the above-mentioned disadvantages of the prior art devices and methods of this general type and which renders unnecessary complicated adjustment and gluing and bonding of two separately produced substrates.

With the foregoing and other objects in view there is provided, in accordance with the invention, an ink jet print head, comprising:

a substrate formed with a plurality of mutually parallel ducts each having an outlet opening and partition walls separating the ducts;

an ink ejection element, selected from the group consisting of thermal elements and piezoelectric elements, operatively associated with each of the ducts for selectively ejecting ink fluid from the ink duct and ejecting ink droplets through the respective outlet openings upon an excitation of the ink ejection element; and a cover plate disposed on the ducts, the cover plate including a first layer disposed directly on the ducts, the first layer being a deposition layer formed with a plurality of openings, and including a second layer disposed directly on the first layer and covering the openings, the second layer being a deposition layer formed by depositing a material selected from the group consisting of boron phosphorus silicate glass and $Si_3N_4$.

In other words, the above-noted objects are satisfied in that the cover plate comprises at least two layers, the cover layer is disposed directly on the duct with its first layer, the first layer is formed with a plurality of openings located above the ducts, and a second layer closing the openings is formed directly on the first layer (on its surface remote from the duct.

In accordance with an added feature of the invention, an electronic trigger circuit integrated inside the substrate.

In accordance with an additional feature of the invention, the thermal element—a heating resistor formed by a polysilicon layer—is disposed on the bottom of the duct. One or more protective layer may be disposed between the duct bottom and the polysilicon layer.

In accordance with another feature of the invention, the ink ejection elements are disposed inside the duct and suspended peripherally from the side walls of the ducts. In that case, the ink ejection elements are formed of erosion-proof material.

When the ink ejection elements are chemical elements, the invention provides for a heat-storing layer disposed below the chemical element distally from the duct bottom. The preferred heat-storing layer is a layer of silicon oxide with a thickness greater than 1.0 $\mu$m.

In accordance with a further feature of the invention, at least one protective layer is disposed between the duct bottom and the ink ejection elements when they are formed of thermal elements. The protective layer is formed with a plasma oxide layer and a plasma nitride layer. Preferably, the plasma oxide layer has a thickness of substantially 300 nm and the plasma nitride layer has a thickness of substantially 600 nm.

In accordance with again an added feature of the invention, a second protective layer is formed on the first above-mentioned protective layer. That second layer is preferably a sputtered tantalum layer.

In accordance with again an additional feature of the invention, the ducts have side walls with a height between substantially 5 $\mu$m and substantially 50 $\mu$m. The side walls may be formed of plasma oxide, polysiloxanes, or polyimide. The first layer of the cover plate may be a layer of structured plasma nitride and structured polysilicon, and the second layer may be formed of boron phosphorus silicate glass or $Si_3N_4$.

With the above and other objects in view there is also provided, in accordance with the invention, a method of producing an ink jet print head, the method which comprises:

providing a substrate and placing ink ejection elements at locations of the substrate where ink ducts of the ink jet print head are to be formed, the substrate defining side walls of the ducts to be formed;

depositing a first layer on the substrate;

structuring the first layer with a multiplicity of openings above locations where the ink ducts are to be formed;

isotropicaly etching the substrate through the openings in the first layer until a plurality of ducts have been etched in the substrate;

depositing a second layer on the first layer and closing the openings; and forming each of the ducts with an outlet opening at a respective end thereof.

In accordance with yet an added feature of the invention, the substrate is deposited as a plasma oxide, polysiloxanes, and polyimide with a thickness of between substantially 5 $\mu$m to 50 $\mu$m onto a base plate. The first layer is structured photolithographically with subsequent dry etching.

The ducts are preferably etched out of the substrate with an isotropic etching process by dry etching with a fluorine-containing plasma in HF steam or by wet etching with BHF. Where the substrate is formed of organic material, such as polyimide, isotropic etching is with $O_2$ plasma.

The second layer may be boron phosphorus silicate glass deposited by CVD deposition or it may be formed by plasma-$Si_3N_4$ deposition. After the second layer is deposited onto the first layer, a flow process may be performed at high temperatures.

The substrate may be formed by the following sequence: in a first step, depositing the substrate to approximately half a desired thickness of the substrate; in an ensuing step, applying a resistance layer and structuring the resistance layer; and in a further step, depositing a second half of the substrate onto the resistance layer. The resistance layer will be exposed directly to the ink in the ducts and, accordingly, it will be formed as an erosionproof layer.

Openings in the first layer at the ends of each of the ducts should be large enough so that an ensuing operation of depositing the second layer does not close the given openings. Those large opening then form the outlet openings.

Other features which are considered as characteristic for the invention are set forth in the appended claims.

Although the invention is illustrated and described herein as embodied in an ink jet print head and method for producing such an ink jet print head, it is nevertheless not intended to be limited to the details shown, since various modifications and structural changes may be made therein without departing from the spirit of the invention and within the scope and range of equivalents of the claims. Specifically, the ink jet print head of the invention and its production method will be described in further detail below in conjunction with exemplary embodiments. In the exemplary embodiments, the ink jet print head and its production method will be described in terms of a print head with thermal excitation. However, it is equally possible to produce a print head with piezoelectric excitation. The invention therefore also relates to such print heads with piezoelectric excitation.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
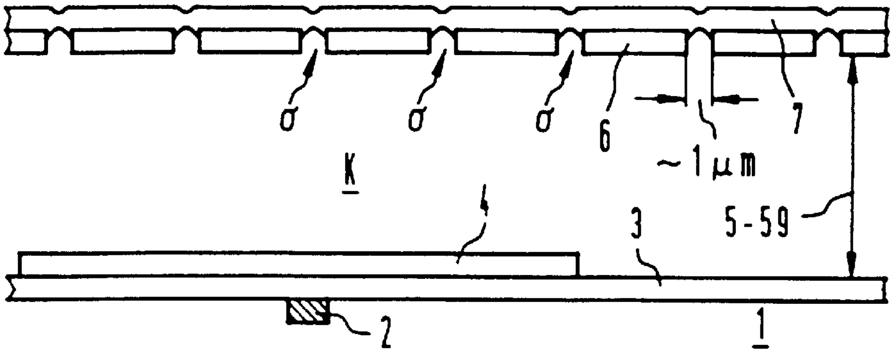
FIG. 1 is a partial, longitudinal sectional view of an ink jet head in the region of the thermal element of a duct, taken along a line I—I in FIG. 3.
Figure 2:
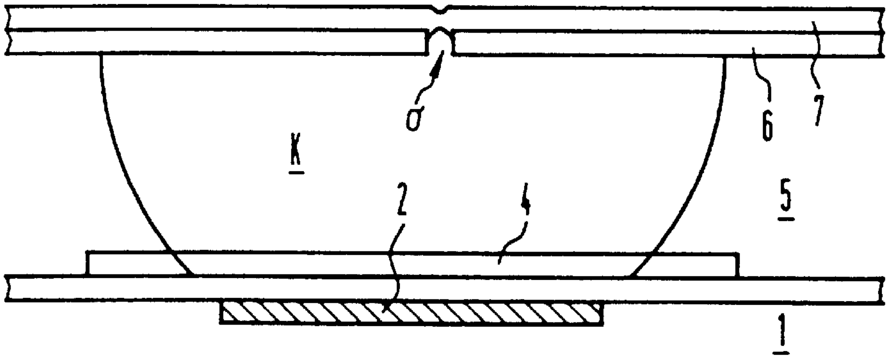
FIG. 2 is a partial sectional view of the ink jet head of FIG. 1 in the region of the thermal element, taken along a line II—II in FIG. 3 in a direction orthogonal to the longitudinal direction of the duct.
Figure 3:
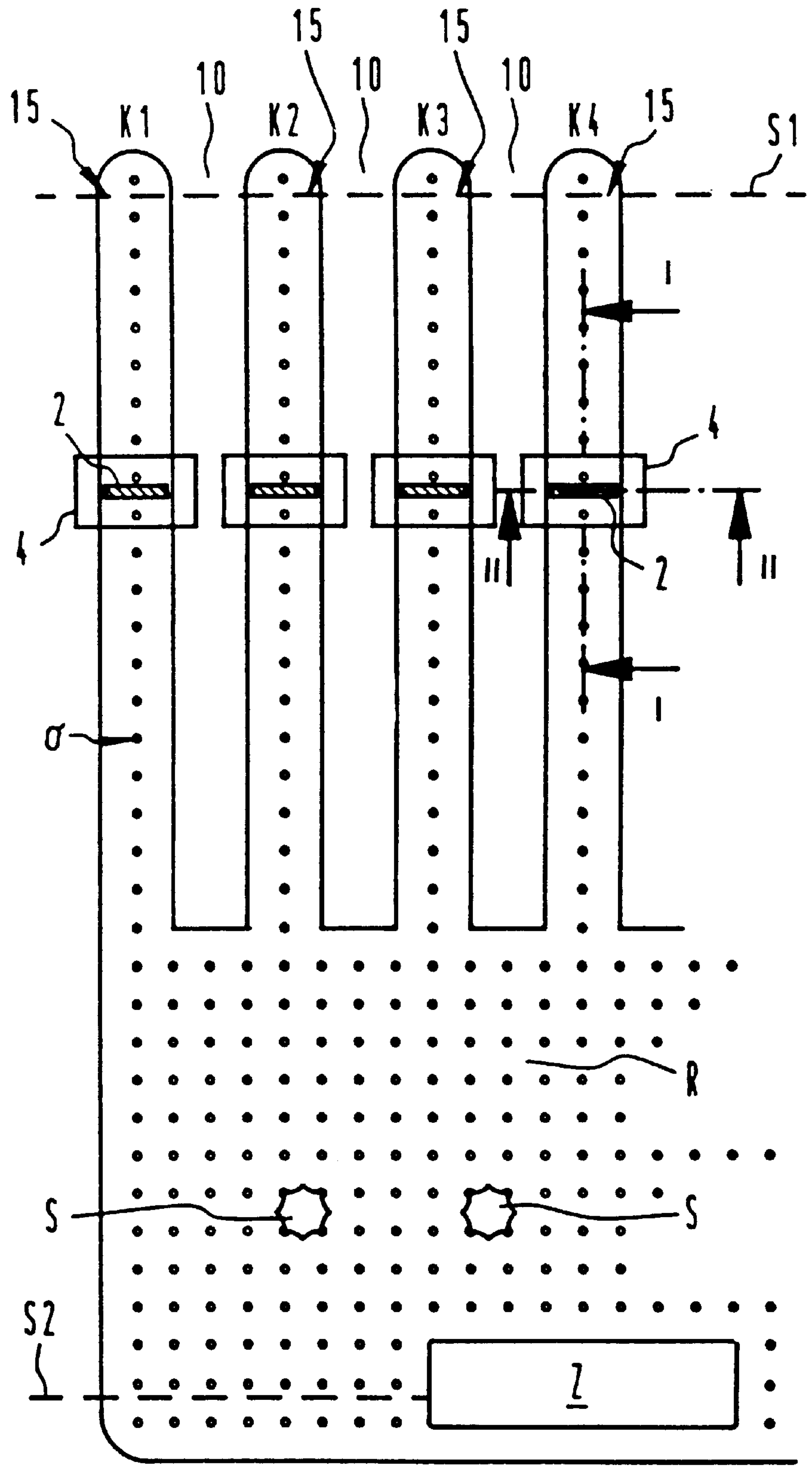
FIG. 3 is a partial top plan view of the ink jet print head of FIGS. 1 and 2 with the second layer of the cover plate not yet placed.

Referring now to the figures of the drawing in detail wherein, unless otherwise noted, identical reference numerals refer to identical parts with the same meaning, and first to FIGS. 1, 2 and 3 thereof, there is seen a configuration of an exemplary embodiment of an ink jet print head according to the invention. The ink jet print head is shown in a schematic, fragmentary plan view in FIG. 3, and the second layer 7, to be explained in detail later, of a cover plate has been removed for the sake of simplicity. The ink jet print head has many mutually parallel ducts K1, K2, K3, K4, located side by side, which may have a width of 50 $\mu$m, for instance. Partitions 10, with a width of 30 $\mu$m, for instance, are disposed between the individual ducts K1 and K2; K2 and K3; and K3 and K4, respectively. The ducts K1, K2, K3 and K4 are still closed on their ends that are shown at the top in the view of FIG. 3. The ducts K1, K2, K3 and K4 can have a total length of 1 cm and on their underside they end in a reservoir R which receives ink fluid. The reservoir R may be provided with support pillars S, which to increase stability connect the bottom and top walls of the reservoir R to one another. In addition, a supply duct Z, by way of which the ink fluid is delivered from a supply container, discharges into the reservoir R.

Each of the ducts K1, K2, K3 and K4 has a region with an associated a thermal element 2. A drop of ink will be expelled from the front end of the respective duct K1, K2, K3 and K4, when the thermal element 2 is excited by a current pulse in accordance with the above-mentioned DOD method. To that end, the ink jet print head shown in FIG. 3 should be cut open along the section line S1 in a production step. This can be done by sawing, notching, etching or breaking along the section line S1, for instance when the ink jet heads that can be made in integrated fashion are separated.

Specific reference will now be had to FIGS. 1 and 2, which show details of the ink jet print head on a larger scale as compared to FIG. 3. The thermal element is a bar of polysilicon, for instance, disposed on an upper main face of a substrate 1. The bar extends orthogonally to the longitudinal direction of the duct K and has a width of approximately 1.5 to 2 $\mu$m and a length that is somewhat shorter than the width of one duct K. The thermal elements 2 of the individual ducts K1, K2, K3 and K4 are preferably disposed side by side, as shown in FIG. 3, so that the drops of ink emerging from the various ducts K1, K2, K3, K4 upon excitation of the respective thermal element 2 can each emerge from the outlet openings, identified by reference numeral 15 in FIG. 3, with the same energy and thus the same speed.

The thermal element 2 acts as a heating resistor zone. The substrate 1 may for instance contain a complete integrated trigger circuit on a silicon substrate. A sufficiently thick heat-storing layer should preferably be disposed below the thermal element 2. This prevents the majority of the thermal energy generated in the thermal element 2 when a current pulse is applied from flowing away in the substrate 1 and not reaching the fluid (ink) in the duct K. The heat-storing layer is $SiO_2$, for instance, with a thickness of greater than or equal to approximately 1.0 $\mu$m. In the case of integration with an electronic trigger circuit on a silicon substrate, a field oxide can be used for this purpose, for instance, preferably with an additional layer of plasma oxide or TEOS.

A protective layer 3, which may for instance comprise 300 nm of plasma oxide and 600 nm of plasma nitride, is disposed on the substrate 1. The protective layer 3 can cover the upper main face of the substrate 1 completely and is used to protect the thermal element 2 against erosion from the ink fluid bubbles as they pop. The protective layer may also serve to protect a trigger circuit, integrated inside the substrate, against mobile ions that may possibly be contained in the ink fluid.

Preferably, a further protective layer 4 that protects against erosion is provided in the region of the thermal element 2. The protective layer 4, as FIGS. 2 and 3 show, extends over the entire outer contour of the thermal element 2 and outward additionally beyond the width of the duct K. The further protective layer 4 may for instance comprise sputtered tantalum (Ta) which is structured by photolithography and $CF_4/O_2$ plasma dry etching.

Over the substrate 1 thus prepared on its main face, a further substrate 5 with a thickness of preferably 5 to 50 $\mu$m is disposed. The substrate 5 defines the depth of the ducts K and thus the height of the side walls of the duct K. The substrate 5 may for instance comprise plasma oxide ($SiO_2$), so-called spin-on glasses (SOGs), polysiloxanes, or polyimide.

A first layer 6, provided with many openings σ is deposited onto the substrate 5, which is initially unstructured, . The layer 6 may for instance comprise plasma nitride or polysilicon and may have a thickness of approximately 1 $\mu$m to 3 $\mu$m. The openings σ, which can be formed by photolithography and ensuing dry etching, are disposed in such a way in the layer 6 that in an ensuing isotropic etching operation, the voids necessary for the ducts K1, K2, K3, K4 and the reservoir R are formed in the substrate 5. By way of example, the openings σ have a diameter of 1 $\mu$m and are arranged in a single row one below the other in the region of the ducts K1, K2, K3 and K4, while in the region of the reservoir, except for the aforementioned support pillars S, they are arranged in many rows side by side and one below the other.

A window for the supply duct Z of FIG. 3 can also be etched out of the layer 6.

The ducts K1, K2, K3 and K4 and the reservoir R (see FIG. 3) are etched by means of an isotropic etching operation, which must be sufficiently selective with regard to the layers 3, 4 and 6. In the event that the substrate 5 comprises plasma oxide or SOG and the layer 6 comprises polysilicon or silicon nitride, the isotropic etching may be dry with a fluorine-containing plasma, in HF steam, or wet with BHF (buffered HF). In the event that the substrate 5 comprises polyamide or some other organic material, the isotropic etching may be performed with an $O_2$ plasma.

Once the desired structuring of the ducts K1, K2, K3, K4, etc. and the reservoir, and thus the underetching of the layer 6 (see FIG. 2) has been completed, a second layer 7 is applied over the layer 6, for instance again by deposition. This layer 7 should preferably be sufficiently nonconformal. This makes complete closure of the openings σ easier. The deposition of the layer 7 is done until such time as the openings σ are closed (e.g. plasma-$Si_3N_4$ deposition), or is terminated before that (e.g., CVD of boron phosphorus silicate glass BPSG). The closure with BPSG is preferably completed by an ensuing flow process at high temperatures.

By the method described, closed ducts K and a closed reservoir R can be created using only a single substrate. The mechanical process of assembling two components as in the prior art is no longer necessary.

If necessary, for the sake of further stabilization or as protection, a further layer or layers can be applied to the layer 7. For mass production purposes, naturally many structures shown in FIG. 3 are produced at a time on a common substrate and they are severed afterward.

Figure 4:
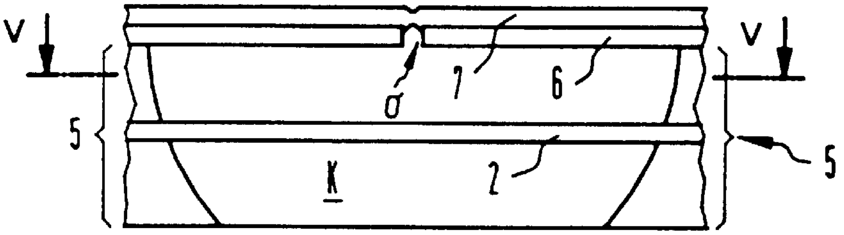
FIG. 4 is a view similar to the view in FIG. 1, with a thermal element disposed inside the duct space.
Figure 5:
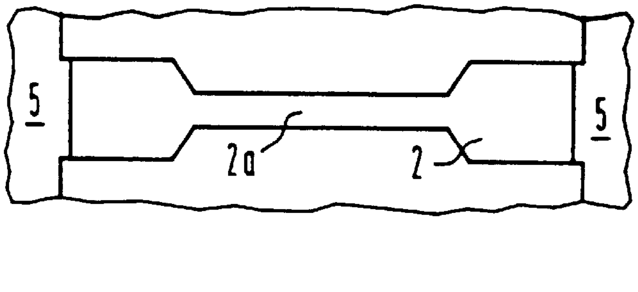
FIG. 5 is a partial sectional view of the ink jet print head taken along the line V—V in FIG. 4.

Instead of the embodiments of an ink jet print head according to the invention as described in conjunction with FIGS. 1–3, in which the thermal elements 2 are disposed in the region of the bottom of the ducts K, it is also possible to dispose the thermal element inside the duct K, as shown in FIGS. 4 and 5.

To that end, as shown in FIG. 4, a resistance layer is disposed inside the substrate 5 and then subsequently structured by photolithography and etching. In the exemplary embodiment of FIG. 4, the resistance layer of the thermal element 2 is disposed approximately halfway up the height of the substrate 5. To this end, onto a base plate not shown in FIG. 4, the substrate 5 is first deposited until its reaches its desired half thickness. Next, the resistance layer is deposited onto the substrate 5 and structured, as shown in FIG. 5. The thermal element 2 is designed here in such a way that a thin bar 2*a* hangs inside the duct K, being suspended on its periphery inside the substrate 5 via wider ribs. The thermal element 2 thus does not rest on the substrate 1 but rather is suspended inside the duct K, so that the energy generated by the thermal element 2 can be given up advantageously exclusively to the ink fluid inside the duct K. This is on the condition, as noted, that the substrate 5 has been deposited in two stages. In the isotropic etching of the substrate 5, the thermal element 2 is automatically laid bare. The wider ribs, located to the left and right of the bar 2*a* in FIG. 5 (plan view along the section line V—V of FIG. 4), act as resistor terminals and can be contacted from either above or below. Since in contrast to the exemplary embodiment of FIGS. 1 and 2 the thermal element 2 is exposed to the ink fluid, it is recommended that the thermal element 2 be made from erosionproof material, such as tantalum. After the resistance layer forming the thermal element 2 has been deposited and structured, the second part of the substrate 5 is deposited.

Figure 6:
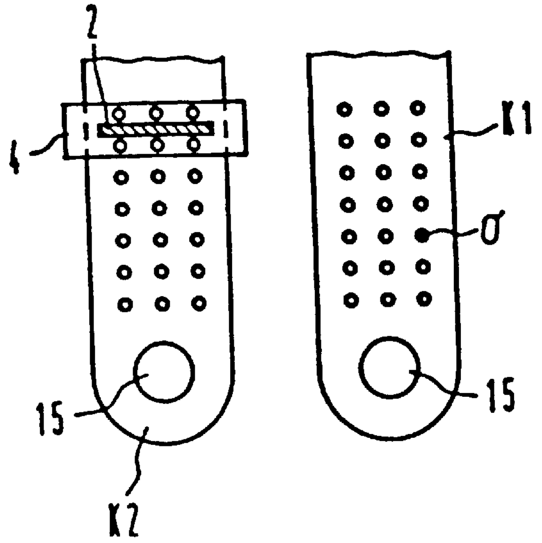
FIG. 6 is a detail view of two duct ends of an ink jet print head, with outlet openings issuing orthogonally to the longitudinal direction of the ducts.

It has been explained in conjunction with FIG. 3 that the upper ends of the ducts K1, K2, K3 and K4 are provided with outlet openings 15, which are disposed on the face ends of the respective ducts K1, K2, K3 and K4. The ducts K1, K2 of an ink jet print head that are shown in detail in the exemplary embodiment of FIG. 6 likewise have outlet openings 15 on their duct ends. However, these outlet openings 15 are formed by circular openings on the upper duct wall. The outlet openings 15 are located in the layer 6, which is disposed above the substrate 4. To assure that the outlet openings 15 will not be closed in the ensuing deposition of the layer 7, the diameters of the outlet openings 15 are selected to be so great that while the openings σ are reliably closed off in the isotropic etching operation, the outlet openings 15 themselves are reliably not closed off. The outlet openings 15 in the exemplary embodiment of FIG. 6 are located parallel to the substrate surface. The outlet openings 15 are preferably larger than 1.0 μm. Expediently, the diameter is chosen to be between 5 and 50 μm. The essential advantage of these outlet openings 15 is considered to be their circular shape, which allows a circular droplet to emerge, so that a dot of exactly circular outer contour can be formed on the paper. Another advantage of this exemplary embodiment is that the outlet openings 15 can be disposed not merely in one row but over a wide area in a matrix. Moreover, no sawing or breaking as in the exemplary embodiment of FIG. 3 is necessary, and thus contamination of the outlet opening can be avoided.

Figure 7:
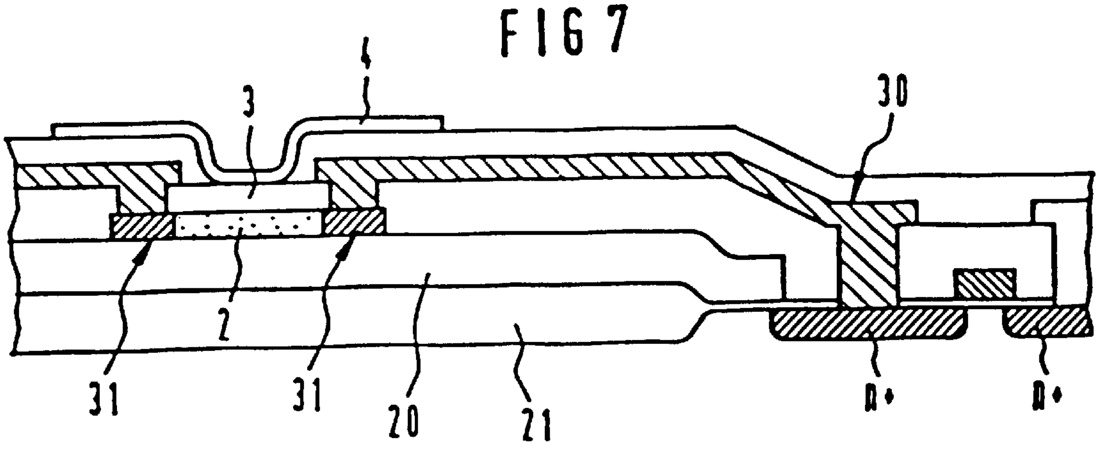
FIG. 7 is a partial schematic view of the ink jet print head with an integrated transistor on a silicon substrate.

In FIG. 7, a detail of the ink jet print head is shown in the region of a thermal element 2 of polysilicon, with an integrated transistor on a silicon substrate. For the sake of greater simplicity, the duct K and the layer 6 and 7 are not illustrated in FIG. 7. The thermal element 2 comprising low doped polysilicon is contacted peripherally by highly-doped polysilicon. The highly doped polysilicon portions are identified by reference numeral 31. The two highly doped polysilicon portions 31 are contacted by metal tracks 30 which form supply lines. Two heat-storing layers 20, 21 are disposed below the thermal element 2. The layer 20, which is formed for instance by TEOS-$SiO_2$, is located directly below the thermal element 2. The further heat-storing layer 21, which is formed for instance by field oxide-$SiO_2$, is located below the layer 20.

The metal track 30 which connects to the highly doped polysilicon portion 31 located on the right also contacts, at its other end, an $n^-$-doped layer that for instance forms the source terminal of an MOS transistor. The metal track 30 may be formed of aluminum or bismuth. The protective layer 3 already described in conjunction with FIG. 1 comprises plasma-$SiO_2$ and one layer of plasma-$Si_3N_4$, which extends over the metal track 30 in the region of the MOS transistor.

We claim:

1. A method of producing an ink jet print head, the method which comprises:

providing a substrate and placing ink ejection elements at locations of the substrate where ink ducts of the ink jet print head are to be formed, the substrate defining side walls of the ducts to be formed;

depositing a first layer on the substrate;

structuring the first layer with a multiplicity of openings above locations where the ink ducts are to be formed;

isotropicaly etching the substrate through the openings in the first layer until the ink ducts have been etched in the substrate;

depositing a second layer on the first layer and closing the openings; and forming each of the ducts with an outlet opening at a respective end thereof.

2. The method according to claim 1, wherein the providing step comprises depositing the substrate from a material selected from the group consisting of plasma oxide, polysiloxanes, and polyimide with a thickness of between substantially 5 μm to 50 μm onto a base plate.

3. The method according to claim 1, wherein the structuring step comprises a photolithographic and subsequent dry etching process.

4. The method according to claim 1, wherein the substrate is formed from a material selected from the group consisting of plasma oxide and polysiloxanes, and wherein the first layer is formed from a material selected from the group consisting of polysilicon and silicon nitride, and wherein the structuring step comprises a photolithographic and subsequent isotropic etching process.

5. The method according to claim 4, wherein the isotropic etching process is a dry etching process with a fluorine-containing plasma in HF steam.

6. The method according to claim 4, wherein the isotropic etching process is a wet etching process with BHF.

7. The method according to claim 1, wherein the substrate is formed of organic material, and the structuring step comprises a photolithographic and subsequent isotropic etching process with $O_2$ plasma.

8. The method according to claim 7, wherein the substrate is formed of polyimide.

9. The method according to claim 1, wherein the step of depositing the second layer comprises depositing boron phosphorus silicate glass by CVD deposition.

10. The method according to claim 9, which comprises, subsequently to depositing the second layer onto the first layer, performing a flow process at high temperatures.

11. The method according to claim 1, wherein the step of depositing the second layer comprises plasma-$Si_3N_4$ deposition.

12. The method according to claim 11, which comprises, subsequently to depositing the second layer onto the first layer, performing a flow process at high temperatures.

13. The method according to claim 1, wherein the providing step comprises, in a first step, depositing the substrate to approximately half a desired thickness of the substrate; in an ensuing step, applying a resistance layer and structuring the resistance layer; and in a further step, depositing a second half of the substrate onto the resistance layer.

14. The method according to claim 13, which comprises forming the resistance layer as an erosionproof layer.

15. The method according to claim 1, which comprises forming a given opening in the first layer at the ends of each of the ducts, the openings being large enough so that an ensuing operation of depositing the second layer does not close the given openings, and wherein the given openings form the outlet openings.

* * * * *